Patented Jan. 7, 1941

2,227,653

UNITED STATES PATENT OFFICE 2,227,653

PROCESS OF STANCHING AND CONSOLIDATING POROUS MASSES

Charles Langer, Paris, France

No Drawing. Application August 27, 1937, Serial No. 161,194. In Switzerland May 25, 1937

5 Claims. (Cl. 61—36)

The present invention relates to the treatment of porous masses for the purpose of consolidating them and rendering them impermeable. Masses capable of being treated in accordance with this invention include soils, fissured rocks, porous masonry or concrete and the like. According to this invention, one injects into such masses a single solution containing sodium silicate, acid and at least one soluble metallic salt in such proportions that a silicic acid gel will be formed after a controllable lapse of time. I have discovered that such control can be effected by varying the proportions of these ingredients. Thus the requirements of any situation may be met.

It is known that soluble metal salts act as strong coagulants on water-glass causing the precipitation from the colloidal solution of silicic acid gel. It is impracticable, however, to use a solution of water-glass and a strong coagulant for purposes of injection because the precipitation is immediate and it is not possible to inject the precipitate into the fine pores of the material which it is desired to consolidate. It has, therefore, been proposed to inject solutions containing an additional substance which functions to prevent coagulation, which substance necessarily had to be removed in order to bring about coagulation. Such removal would be effected, for example, by means of a second injection of a gas or another solution. Another proposal has been to inject a single solution of water-glass and a slow-acting weak coagulant. This method, however, fails to bring about the desired solidifying action.

Where the production of the gel has been accomplished by the injection of two different substances, dependence is placed upon a reaction in situ which depends upon contact between the substances separately injected. Since it is impossible to assure complete mixing of the two substances within a porous mass there is no assurance that the spaces within the mass will be uniformly filled with the gel. In the case where gas is injected to produce coagulation, it is attended with the disadvantage that gas-filled voids are produced which weaken the mass intended to be strengthened and the escape of the gas moreover causes fissures which increase the permeability of the mass which it is desired to render impermeable.

It has now been found that it is possible to produce a single solution which will coagulate to form silicic acid gel within a definite period of time which is capable of being accurately regulated. In this solution it is possible to use a strong coagulant which will produce a uniform homogeneous gel. The solution is water-clear, extremely fluid and contains no sediment or precipitate which will hamper the process of injection. The solution is moreover substantially diluted and is consequently much more economical than the concentrated solutions heretofore used. The low viscosity of the solution enlarges the radius of action and increases the uniformity of impregnation. It also widens the field of application for the reason that it is capable of being used in the treatment of masses in which the pores are of very small dimension.

The present invention, as distinguished from prior processes, can be used for consolidating salty soils such as soils near bodies of salt water. With prior processes the salt solution in the soil brings about immediate coagulation of the silicate solution, thus preventing proper penetration of the solution. According to this invention, the pH-value of the solution used can be adjusted to counteract the alkalinity of the soil and thus permit complete control of the impregnation.

In accordance with the invention, the solution consists of water-glass and a reactive agent comprising an acid and a strong coagulant.

In the present process the existing pH-value of the sodium silicate is decreased by the addition of an acid in order to obtain a weaker alkaline solution. By further adding a suitable salt of a heavy metal (iron, copper, lead, zinc and the like) as an electrolyte, the latter solution is destroyed and coagulates to a gel. By decreasing the pH-value the sodium silicate solution becomes more sensitive and the coagulation to a gel in the ground or other mass being treated may be produced at any time desired by means of a correspondingly accurate quantity of the electrolyte. Under certain circumstances it may prove of advantage to simultaneously use two or more different metallic salts, and the invention is therefore not to be taken as limited to the use of a single salt. The gel obtained in this manner after a certain length of time hardens through loss of water and through the transformation of the ultra-micron into ultra-microscopic crystals. One may observe the presence of quartz-crystals after having stored the gel for two months at room temperature.

The present process has been applied practically, and I cite here two examples:

A fine quicksand soil has been consolidated according to the present process, for the purpose of facilitating excavation for the foundation work of a water purification plant. The quicksand had the following grain-distribution: 80% of the particles were smaller than 0.11 mm., 50% smaller than 0.098 mm., 30% smaller than 0.09 mm. and 10% smaller than 0.076 mm. The permeability of the sand, at a temperature of 15° C., was $k=9.1\times10^{-1}$ cm. min. The injected solution consisted of industrial sodium silicate or waterglass, of 36° Bé. diluted with an equal amount, by weight, of water, to which solution was added a reactive agent consisting of hydrochloric acid and copper sulphate, in the proportion of two parts by volume of sodium silicate solution to one part by volume of the said reactive agent. The injected solution after about 47 minutes coagulated in the ground to a silicic acid gel.

The reactive agent of hydrochloric acid and copper sulphate, referred to in the foregoing example, may be made up by dissolving the copper sulphate (blue vitriol) in a diluted solution of the acid. For example, from 5 to 20 grams of copper sulphate are dissolved in 75 cc. of commercial hydrochloric acid diluted with 925 cc. of water. For a given amount of this reagent added to the sodium silicate, the time of setting will decrease as the amount of copper sulphate or other metal salt is increased.

By means of a double row of injection pipes a cylindrical zone as well as a base plate was consolidated, in order to avoid a flow of the remaining sand during the excavation. The outer zone of injection, i. e. the ground covered by the outer row of injection pipes, initially was subjected to only slight pressure (0.5 atm. gauge at the beginning and 3-4 atm. gauge at the end). The pressures in the inner zone of injection after a short time amounted to 7-8 atm., i. e. the ground here offered a great resistance to these injections due to the preceding treatment.

In this manner the foundation was carried down to about 50 feet below ground-water level and the work done in the dry without caissons and without the use of special pumps.

The second example refers to the consolidating and rendering impermeable of very porous concrete test specimens taken from a dry dock. The concrete of the latter, deteriorated by the action of the seawater, before the treatment showed a permeability of about $1\times10^{-3}$ cm. second. The above mentioned solution was injected under an average pressure. The concrete after treatment showed a permeability of about $1\times10^{-8}$ cm. per second under a pressure of 5 atm. gauge.

The amount of acid added to the water-glass solution, as a part of the reactive agent, so affects the stability of the solution that by means of the salt in the reactive agent, acting as a coagulator, a uniform homogeneous silicic acid gel is obtained after the lapse of a period subject to precise regulation.

It will readily be understood that by regulating the amount of agent the solution may be caused to gel at such time after its injection as may be desired. In a case where underground conditions are encountered which tend to carry away the injected solution it may be adjusted to gel very rapidly. Or if, for example, it is desired to allow the solution to penetrate through the soil or other mass for a considerable distance, its time of setting may be suitably delayed.

What I claim and desire to secure by Letters Patent is:

1. A process for consolidating and rendering impermeable pervious soils, fissured-rock, masonry, concrete and the like which comprises introducing into the mass to be treated a single solution consisting of a mixture of water-glass with a reactive agent comprising an acid and a soluble salt of a heavy metal, the proportion of said agent to the water-glass being such that a silicic acid gel is formed in situ after a delay sufficient to permit the desired impregnation of the mass.

2. A process for consolidating and rendering impermeable pervious soils, fissured-rock masonry, concrete and the like which comprises introducing into the mass to be treated a single solution containing a colloidal alkali silicate solution capable of being coagulated to form a silicic acid gel, a reactive agent for coagulating the solution containing a heavy metal salt as coagulant and an acid for delaying the coagulation, and regulating the time of coagulation by adjusting the proportion of said agent to the water-glass.

3. A process of treating masses of porous material to consolidate them and render them impermeable which comprises introducing into the mass an alkaline solution comprising sodium silicate, an acid, and a heavy metal salt.

4. A process of treating masses of porous material to consolidate them and render them impermeable which comprises introducing into the mass an alkaline solution comprising sodium silicate, hydrochloric acid, and a heavy metal salt.

5. A process of treating masses of porous material to consolidate them and render them impermeable which comprises introducing into the mass an alkaline solution comprising sodium silicate, hydrochloric acid, and copper sulphate.

CHARLES LANGER.